US007320165B1

(12) United States Patent
Hard

(10) Patent No.: US 7,320,165 B1
(45) Date of Patent: Jan. 22, 2008

(54) PIPE COUPLER

(76) Inventor: William E. Hard, 1022 Fox Hunt Trail, Alexander, AR (US) 72002

( * ) Notice: Subject to any disclaimer, the term of this patent is extended or adjusted under 35 U.S.C. 154(b) by 0 days.

(21) Appl. No.: 11/456,757

(22) Filed: Jul. 11, 2006

(51) Int. Cl.
*B23P 11/00* (2006.01)
*B25B 27/00* (2006.01)

(52) U.S. Cl. .......................................... 29/272; 29/237

(58) Field of Classification Search .................. 29/272, 29/237, 267–268
See application file for complete search history.

(56) References Cited

U.S. PATENT DOCUMENTS 4,054,984 A * 10/1977 Ball et al. ..................... 29/237
4,722,468 A * 2/1988 McClure .................... 228/49.3
4,893,393 A * 1/1990 Marshall ...................... 29/237
2005/0120531 A1* 6/2005 Shelton ....................... 29/272

* cited by examiner

*Primary Examiner*—Lee D. Wilson
(74) *Attorney, Agent, or Firm*—Joe D. Calhoun

(57) ABSTRACT

A pipe coupler gripping each pipe with hand grip actuated clamps, and seating the end of one pipe in the aligned end of another pipe using leverage plates having a slot or channel with a drop notch, facilitating additional leveraging.

19 Claims, 9 Drawing Sheets

PIPE COUPLER

(B) CROSS REFERENCE TO RELATED APPLICATIONS

Not applicable.

(C) FEDERALLY SPONSORED RESEARCH AND DEVELOPMENT

Not applicable.

(D) MICROFICHE APPENDIX

Not applicable.

(E) BACKGROUND OF THE INVENTION (1) Field of the Invention.

This invention generally relates to coupling devices for use by electrical and plumbing contractors laying underground pipe or conduit. More particularly, this invention relates to machines facilitating the manual coupling of a pair of pipes aligned end to end.

(2) Description of Related Art Including Information Disclosed 37 CFR 1.97 and 1.98

Piping used by electrical or plumbing contractors usually have an annular collar at one end of each pipe, flaring slightly to form a slightly bell-shaped end. The other end of each pipe may be received telescopically in the bell-end collar of an adjacent aligned pipe when a pipeline is being formed.

In the assembly of such a pipeline, it often becomes necessary for each pipe to be pulled in the direction of the aligned collar until its end extends into the bell-end collar. Often considerable force may be required to draw them together, sometimes more force than workers can readily exert directly on the pipes; this may be especially true when the pipes are lying at the bottom of a trench, which is often the case. Therefore, various devices have been devised in the prior art to provide the necessary mechanical advantage to enable the workers to draw the pipes together. It is necessary that such devices apply little, if any, lateral force to the pipes as they are drawn together in order to maintain the pipes in alignment. Moreover, many modern pipelines are constructed of piping made of polyvinyl chloride (PVC) or similar plastic materials, that may buckle or bend upon application of force against the sides. Installing PVC pipe is labor intensive, and sometimes installers do not seat the pipe in the bell completely. When pipe is not seated completely, the pipe sometimes comes apart when covered up with dirt.

As mentioned above, it is the usual practice to assemble the pipe at the bottom of a trench. The width of the trench is made as narrow as possible to reduce costs. Thus the device used to assemble the pipes should be compact in size, in order to accommodate this minimum trench width.

It will be appreciated by those skilled in the art that one longstanding difficulty associated with layering bell-coupled pipe systems is the difficulty in carrying out the repetitive task of pulling adjacent pipe sections together, especially since there may be considerable frictional engagement between the male end within the bell-end. In the past, considerable difficulty has been experienced in properly holding a pair of plastic pipes in confronting and abutting relationship while the members were joined end to end or when pipes were disassembled. This is especially true when the two pipes had to be accurately joined together or when the pipe had to be disassembled in underground narrow trenches. Such difficulty was greatly increased where the plastic pipes were curved. For example, some plastic pipes are packaged in coils which may result in the pipes having an arc which creates difficulties in keeping the pipes straight when joining them.

Devices to facilitate coupling of piping have been available for several years. Known in the art are the following, arguably related to the patentability of the present invention.

| U.S. Pat. No. | 1st Inventor | Date of Patent/Publication |
|---|---|---|
| 3,257,714 | Duke | Jun. 28, 1966 |
| 3,364,555 | Swink | Jan. 23, 1968 |
| 3,435,507 | Pronovost | Apr. 1, 1969 |
| 3,571,896 | Wilkerson | Mar. 23, 1971 |
| 3,653,115 | Perkins | Apr. 4, 1972 |
| 3,668,766 | Carter | Jun. 13, 1972 |
| 4,015,323 | Topper | Apr. 5, 1977 |
| 4,178,668 | George | Dec. 18, 1979 |
| 4,519,122 | Miller | May 28, 1985 |
| 4,598,452 | Iseki | Jul. 8, 1986 |
| 4,748,730 | George | Jun. 7, 1988 |
| 4,893,393 | Marshall | Jan. 16, 1990 |

There are several patents that disclose a pair of clamps for gripping the two pipes, and a handle actuated leverage assembly. For example, see U.S. Pat. No. 4,519,122 issued to Miller, U.S. Pat. No. 3,653,115 issued to Perkins and U.S. Pat. No. 4,598,452 issued to Iseki. However, none of those patents discloses a guide track channel on the leverage assembly, terminating with a drop notch enabling additional leveraging/coupling.

U.S. Pat. No. 4,748,730 issued to George discloses a pair of semi-circular pipe straddling assemblies (linked by a pair of rods), one assembly straddling a pipe near its bell end and the other straddling a free section of pipe near its spigot end. One of the straddling assemblies includes a pair of cam disks having marginal teeth, both toothed cams pivotally operable against opposite sides of the free section of pipe captured between that straddling assembly; repetitive movement of an actuator handle, reciprocatingly back and forth along the direction of the aligned pipes, causes the toothed cams to alternately extend inwardly through spacing in the respective straddling assembly, to engage and pull the pipe (and then withdraw out of engagement with the pipe), thereby ratcheting the spigot end of the free pipe section into frictional seating within the bell end of the other pipe. This patent does not disclose a pair of clamp grips. Moreover, this patent does not disclose a guide track channel on the leverage assembly, terminating with a drop notch enabling additional leveraging/coupling.

(F) BRIEF SUMMARY OF THE INVENTION

In essence, the device facilitates the coupling of aligned pairs of pipes, by gripping them and allowing the user to manually leverage both together for coupling. Although the pipe coupler of the present invention has several embodiments, the invention described essentially comprises (includes) an adjustable means of temporarily gripping opposite sides of a pipe having a female-end, an adjustable means of temporarily gripping opposite sides of a separate pipe having a male-end aligned with the female-end, and a means of leveraging the male-end into the female-end, including a leverage handle.

One prototype of the Pipe Coupler comprises a pair of pipe grips (or modified locking vise-grip C-clamps), one for gripping behind the female "bell coupling" end of an already-connected (i.e., stationary) section of pipe, the other for gripping the free male end of a new pipe section awaiting coupling with the already-connected section of pipe. Each of those grips is essentially a hand actuated set of lockable pincer C-clamps, modified so that actuation will allow firm locking-gripping of a pipe without applying an excessive amount of force to the pipe.

Standard vise-grip C-clamps (known in the field) include handles similar to those of pliers, actuating the opening and closing of two half-Cs in which the tips (the opposite ends of the C) come together to clamp the desired item; known vise-grips also have a bolt extending into the end of one handle, allowing adjustment of the amount of spread (or separation) of the clamping tips when the handles are completely squeezed together. Known locking vise-grips also lock when completely squeezed together, they have a lever on the inner surface of the other handle, allowing the grips to be unlocked from their fully closed position. The present invention modifies the known locking vise-grip C-clamps, by removing each clamping section of the two half-Cs, and replacing each with a concave shoe having its concave surface positioned to interface with a portion of a pipe. In this manner, each pipe gripping assembly may be adjusted to straddle essentially opposite sides of a pipe, and grip the pipe without applying force that could damage the pipe or scar its surface; and each pipe gripping assembly is capable of gripping pipes having different diameters.

The leverage assembly essentially comprises an inverted U-shaped pathway having a leverage handle upstanding from the top of the inverted U; the new pipe section runs between the two leverage plates forming the sides of the inverted U (without being gripped or impeded by the leverage assembly).

Each side of the bell grip pincers connects to the respective leverage plate via a respective metal arm, with a pivot pin connection at the bell grip end and a pivoting fulcrumatic connection at the leverage plate end of each arm. Each side of the male-end grip pincers also connects to the respective leverage plate via a respective metal leg, with a pivot pin connections at both the pipe grip end and the leverage plate end of each leg; however, both pivot connections to both leverage plates are within a guide track channel (rather than through a pivot-pin hole), allowing some movement of the leverage plates (as will be explained below) even while both pipe sections remain stationary.

When both grips are clamped to their respective section of pipe (preferably with the leverage handle in its starting position nearest the stationary "bell" end, and with the end of the new pipe section inserted into the bell), the pin connecting the leg to the leverage plate should be situated at the end of the guide track channel closest to the clamp connected to the other side of that leg. (Note that it does not matter which pipe end, the bell-end of one pipe or the non-bell end of the other pipe, is clamped in which of the pipe grips; the pipe coupler will move one type of pipe end into the other type of pipe end, regardless of which is clamped by which grip) Movement of the leverage handle toward the new pipe section pulls the new pipe section further into the bell-end (without any movement of the pin within the guide track channel). This is usually enough to fully set the male-end within the bell-end, especially if the bell-end is a "short bell" (known in the field as having a relatively short length of pipe-end expanded into the "bell"). However, for "long bell" piping (known in the field as having a relatively longer length of pipe-end expanded into the "bell"), one stroke of the leverage handle might not fully seat the male-end within the bell-end for complete coupling.

Additional leveraging (to fully seat the new pipe end in the bell coupling) may be provided by the guide track channel, having a drop-notch at the end of the channel nearest to the bell-end. Returning the leverage handle to its original starting position will cause the pins within the channel to move to the end nearest to the bell end, and gravity will cause the pins to fall into the drop notch, seating them in place for the second bout of leveraging to be accomplished by repeating the movement of the leverage handle toward the male-end. Both grips can then be unclamped, and the leveraging device moved to the bell-end of the newly-coupled pipe section so that the male-end of the next new section of pipe may be coupled with it.

One primary object of the present invention is to provide a coupler that will readily couple pipes in the field.

Another primary object of the present invention is to provide a coupler that is portable and easy to operate.

It is another object of the present invention to provide a coupler that may reliably be used by only a single person.

Other objects will be apparent from a reading of the written description disclosed herein, together with the claims.

(G) BRIEF DESCRIPTION OF THE SEVERAL VIEWS OF THE DRAWINGS

Figure 1:
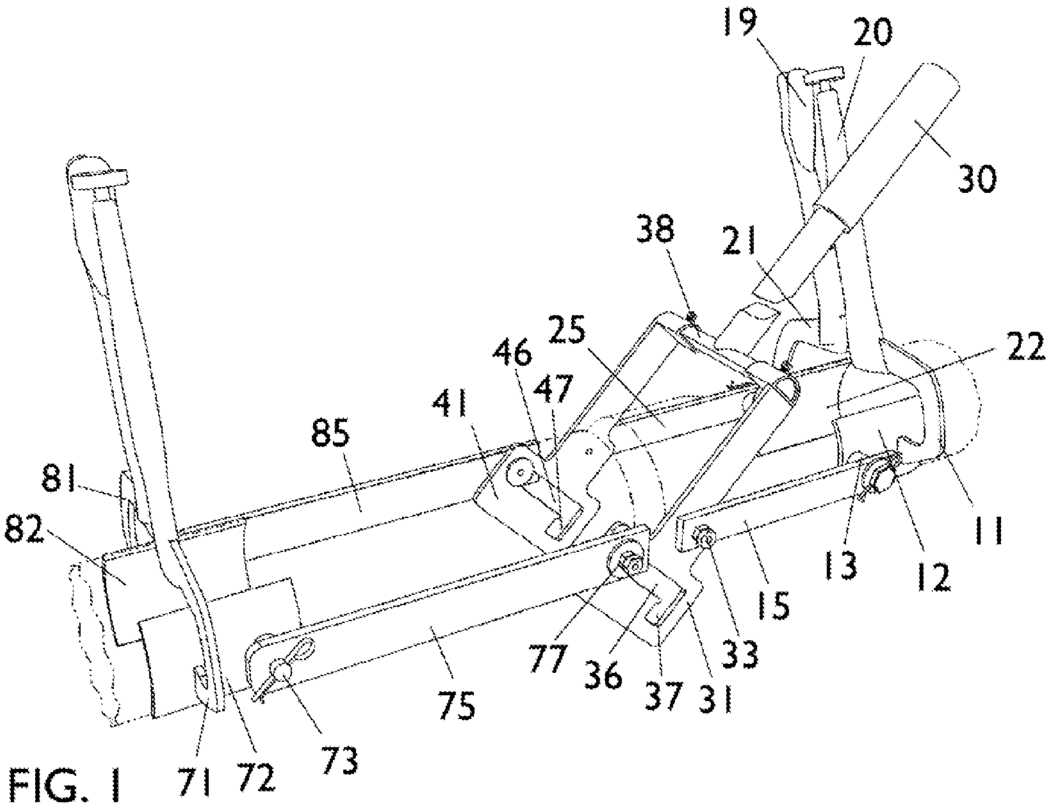
FIG. 1 depicts a perspective view of the invention in its first starting position for its first coupling stroke, with hypothetical aligned pipes appearing in phantom.
Figure 2:
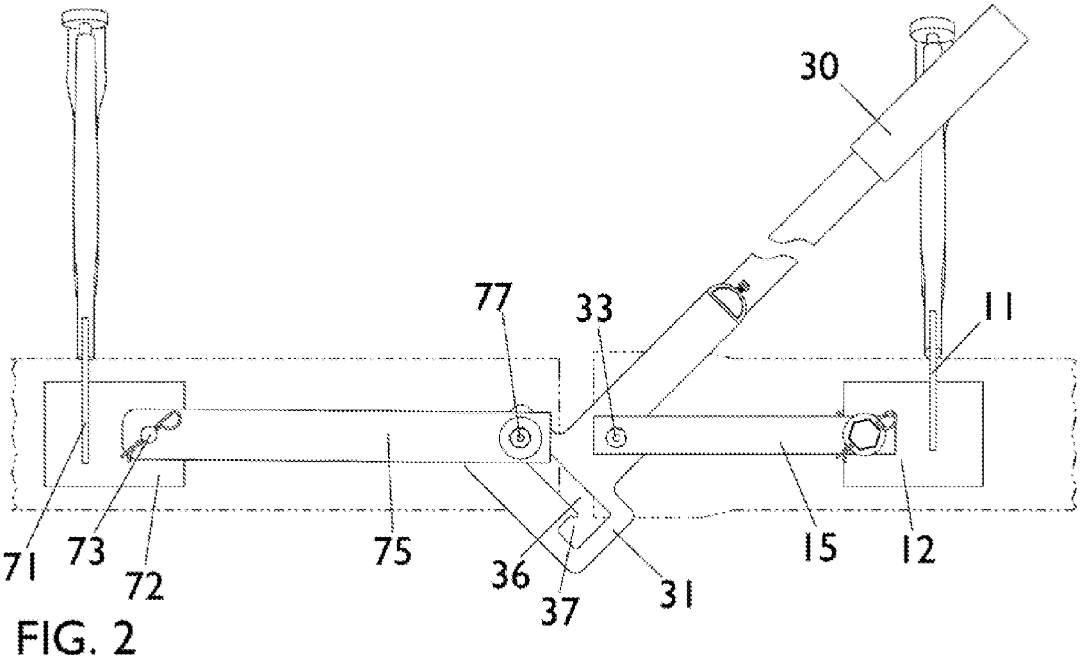
FIG. 2 depicts an elevation view of the right side of the invention of FIG. 1.
Figure 3:
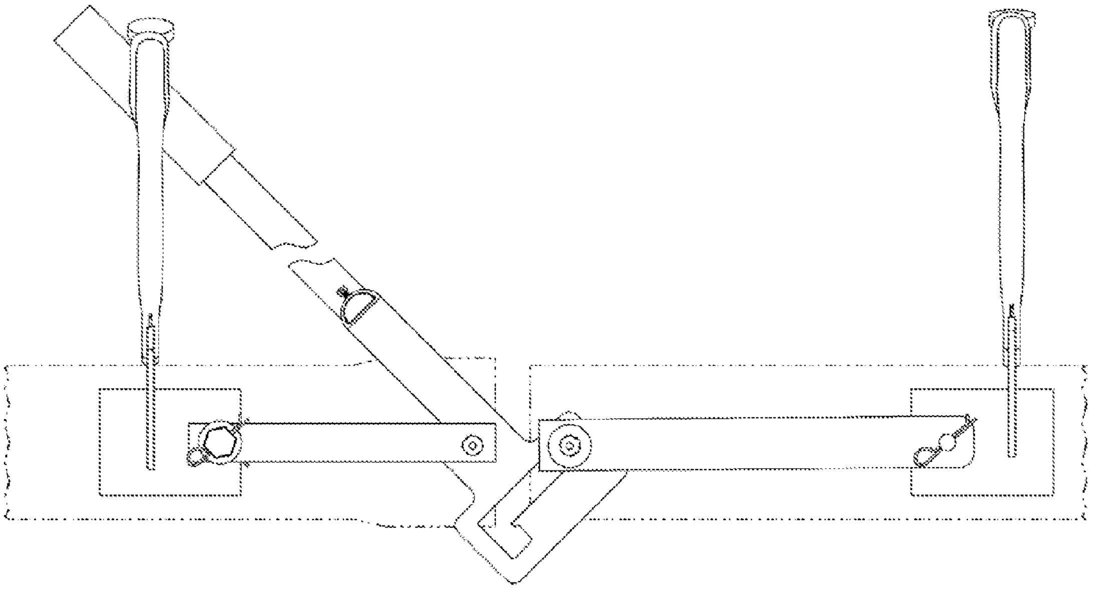
FIG. 3 depicts an elevation view of the left side of the invention of FIG. 1.
Figure 4:
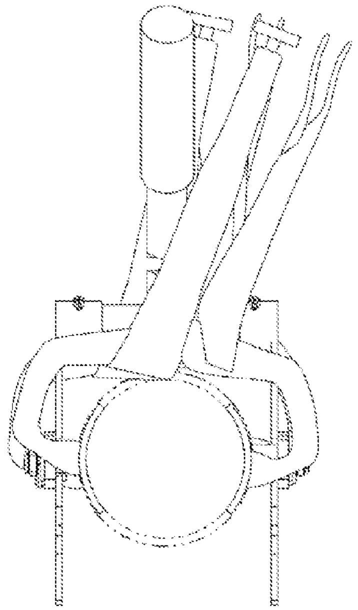
FIG. 4 depicts an elevation view of the bell-connector end of the invention of FIG. 1.
Figure 5:
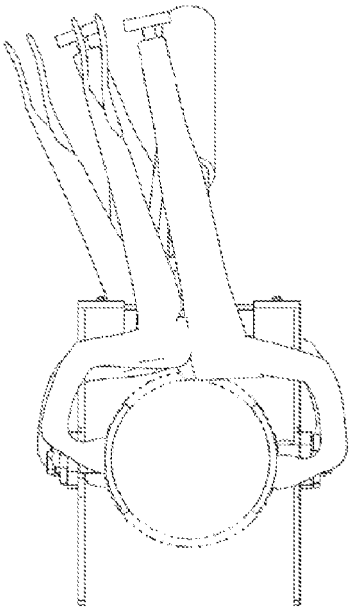
FIG. 5 depicts an elevation view of the other end of the invention of FIG. 1.
Figure 6:
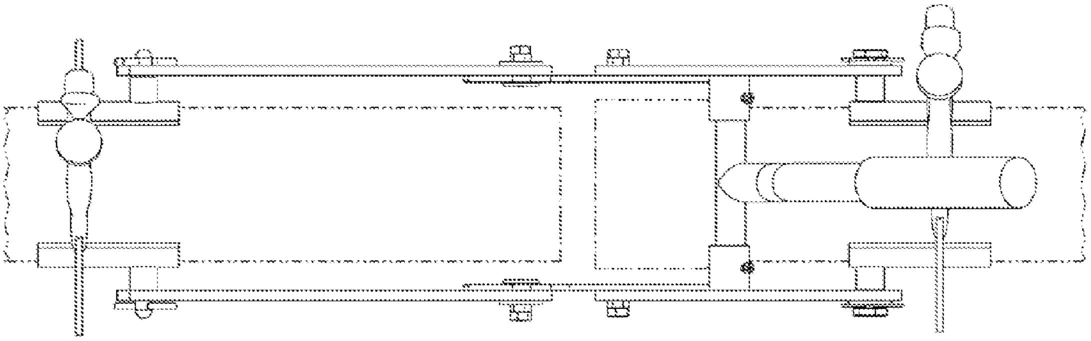
FIG. 6 depicts a top plan view of the invention of FIG. 1.
Figure 7:
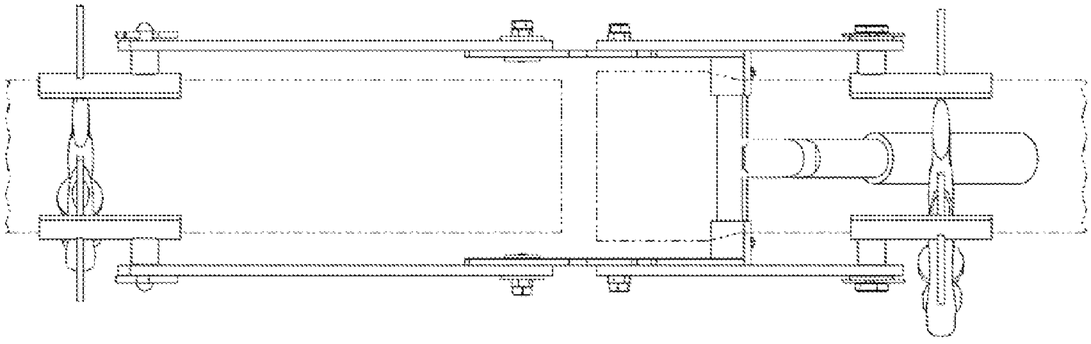
FIG. 7 depicts a bottom plan view of the invention of FIG. 1.
Figure 8:
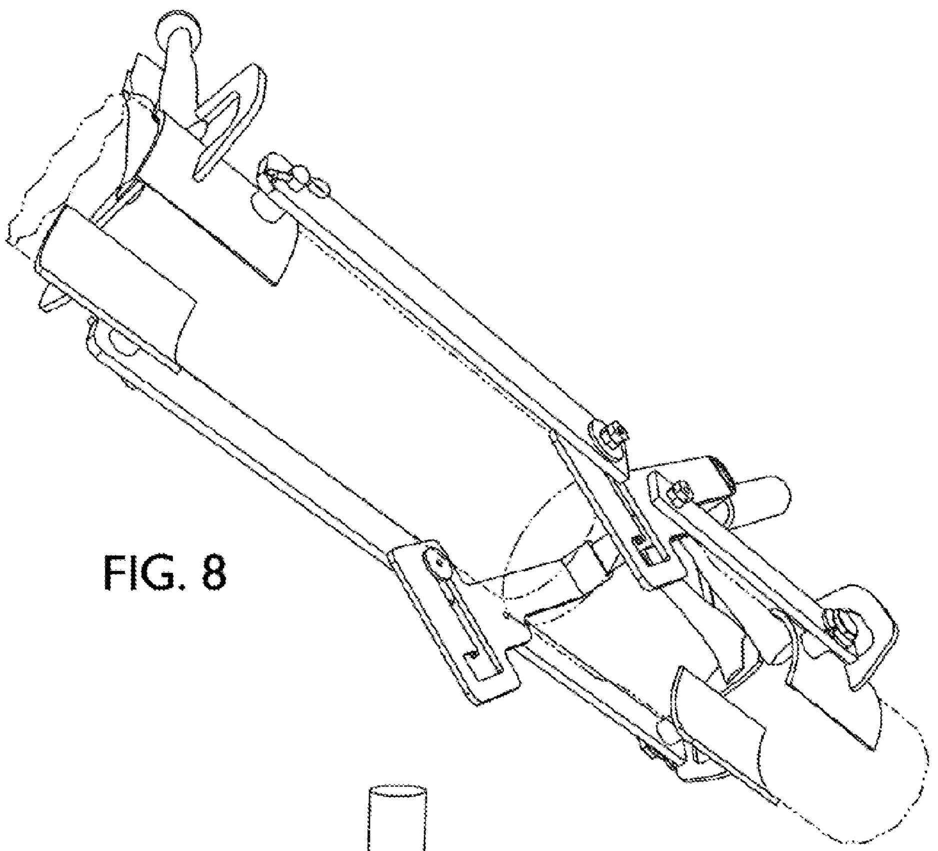
FIG. 8 depicts a perspective view of FIG. 7 from beneath the invention.
Figure 9:
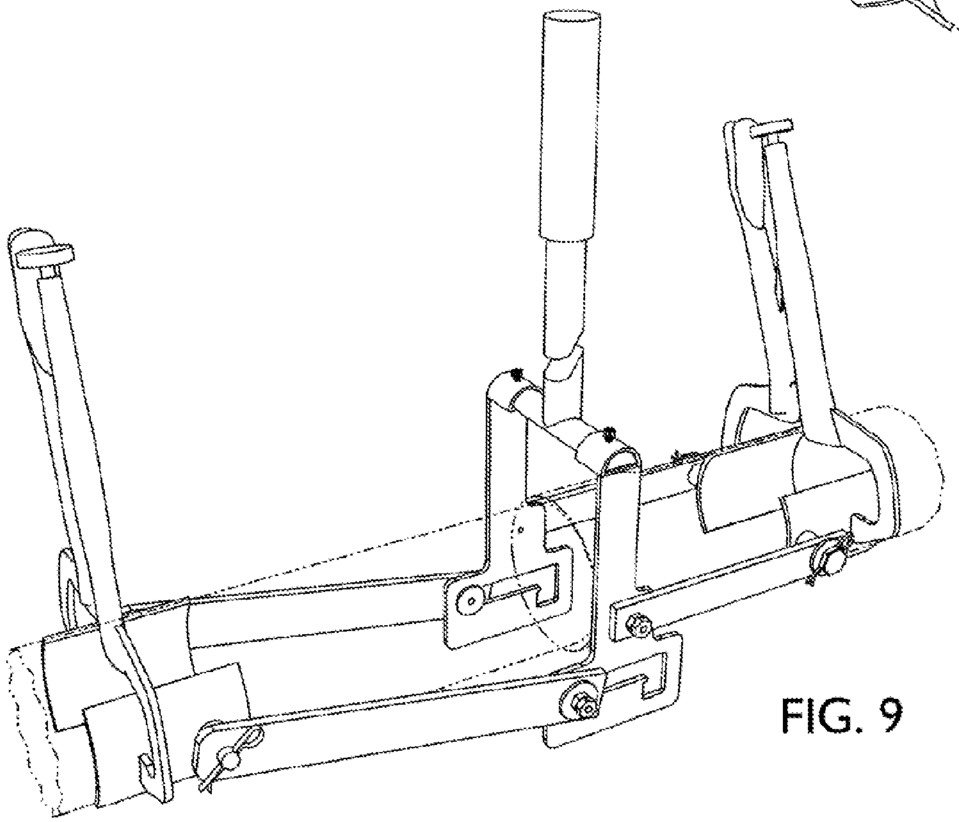
FIG. 9 depicts a perspective view of the invention of FIG. 1, midway through its first coupling stroke.
Figure 10:
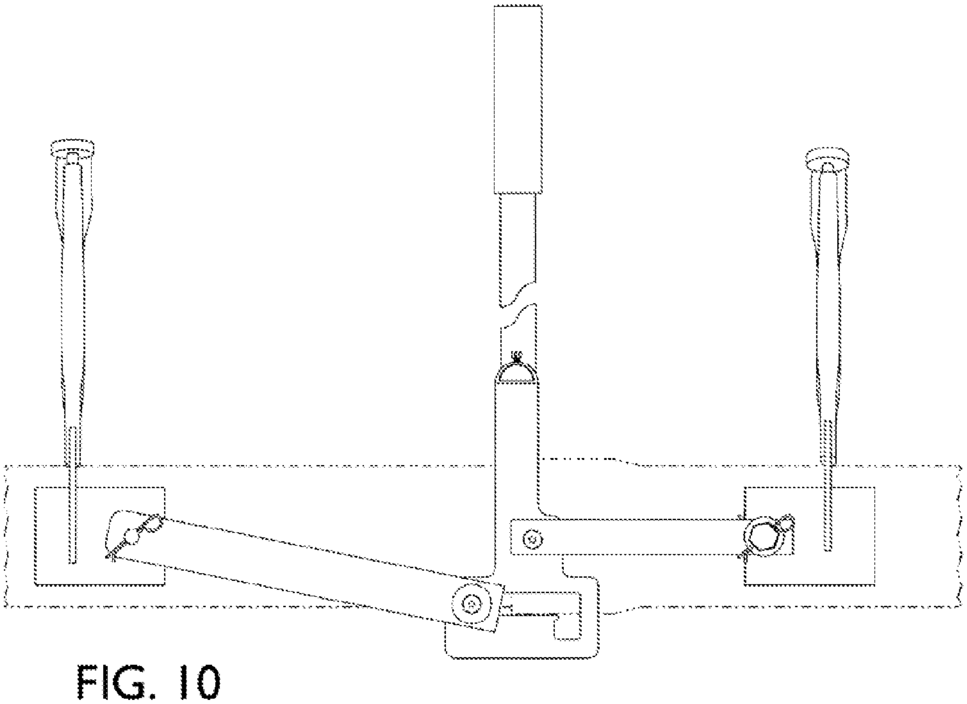
FIG. 10 depicts an elevation view of the right side of the invention of FIG. 9.
Figure 11:
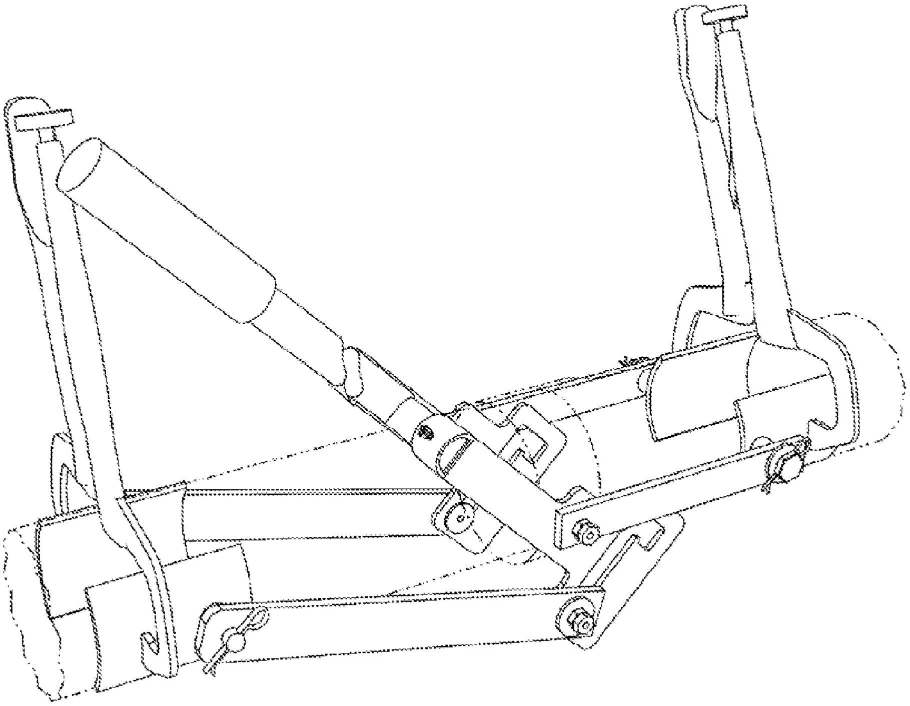
FIG. 11 depicts a perspective view of the invention of FIG. 1, at the end of its first coupling stroke.
Figure 12:
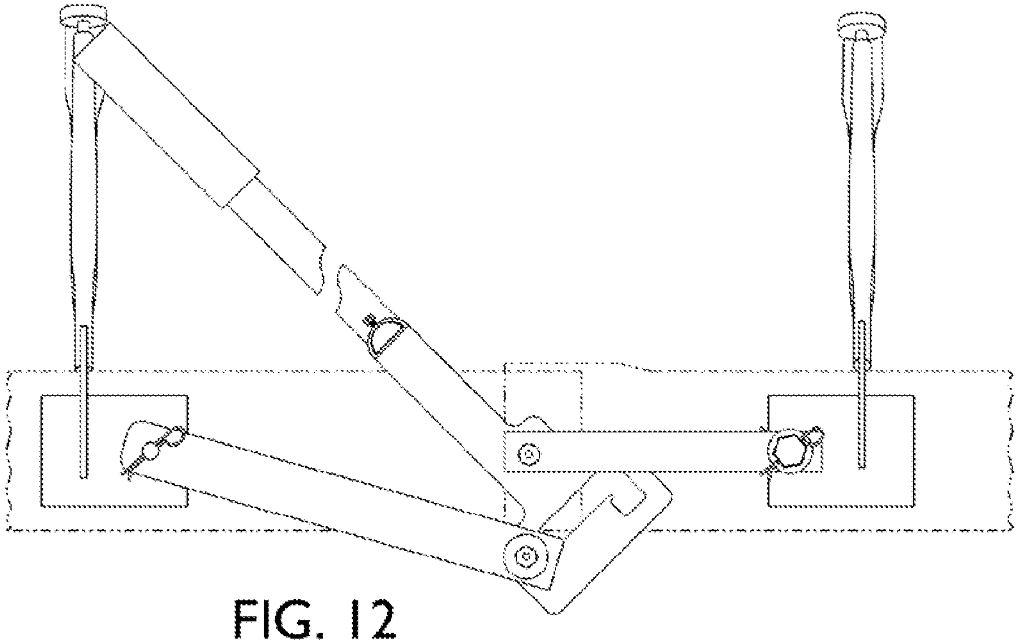
FIG. 12 depicts an elevation view of the right side of the invention of FIG. 11.
Figure 13:
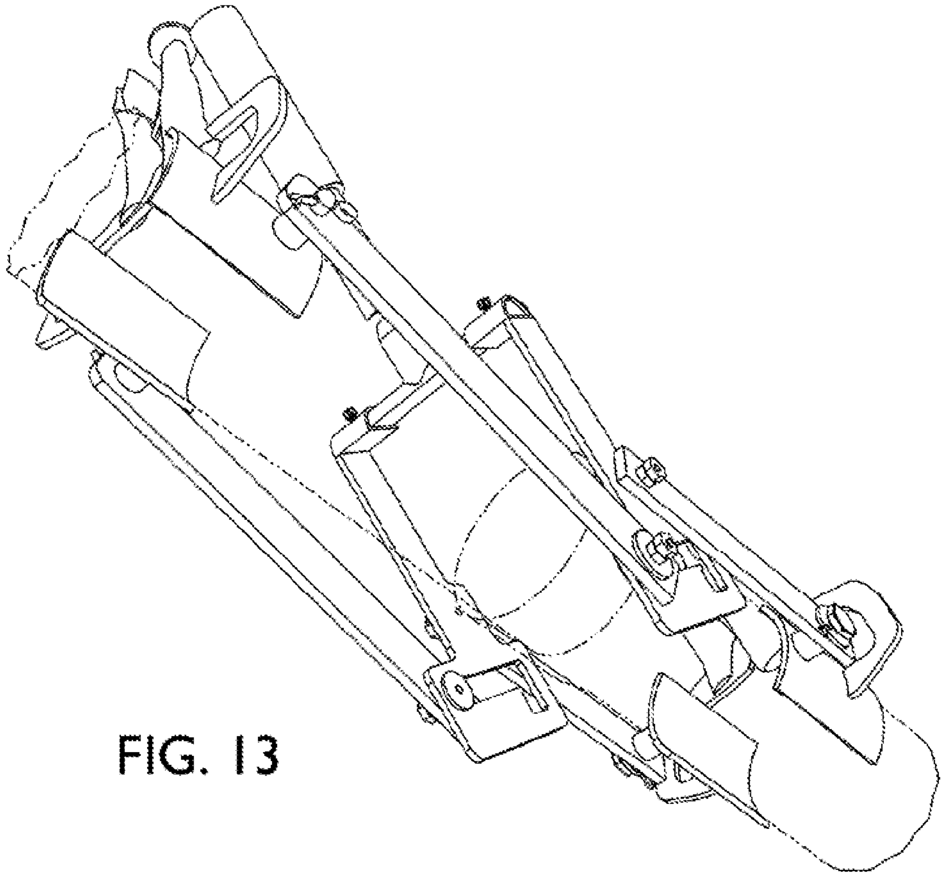
FIG. 13 depicts a perspective view of FIG. 12 from beneath the invention.
Figure 14:
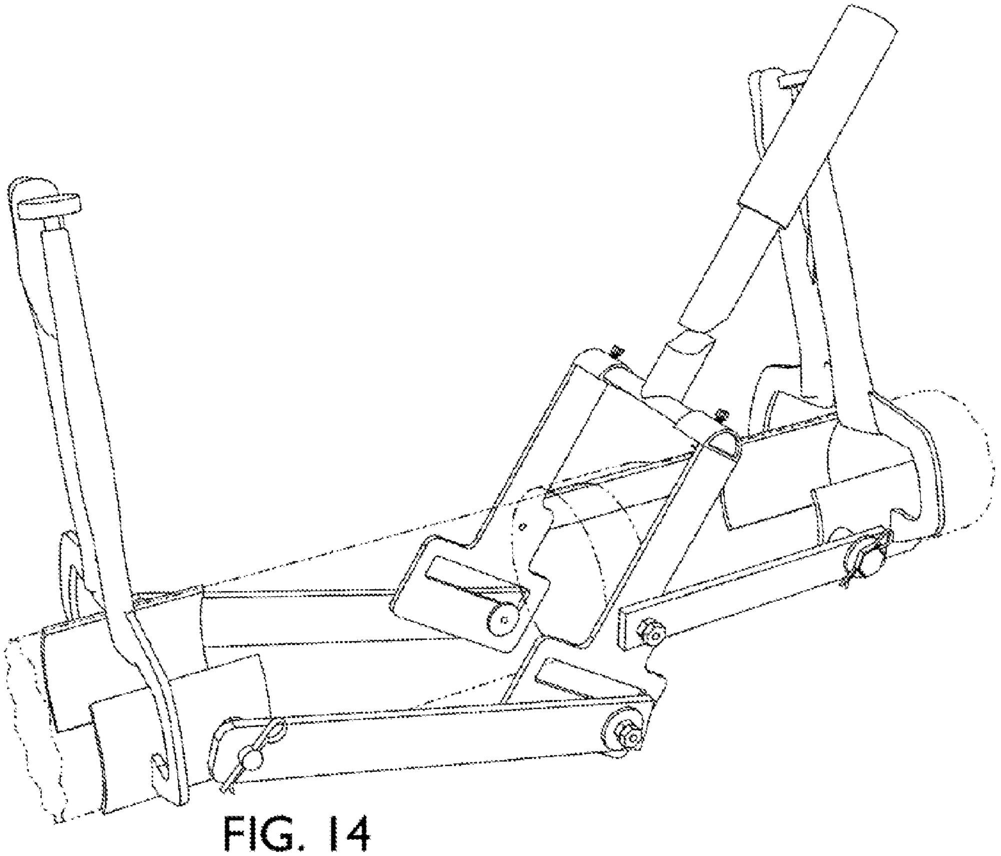
FIG. 14 depicts a perspective view of the invention of FIG. 1 in its second-stroke starting position for its second coupling stroke.
Figure 15:
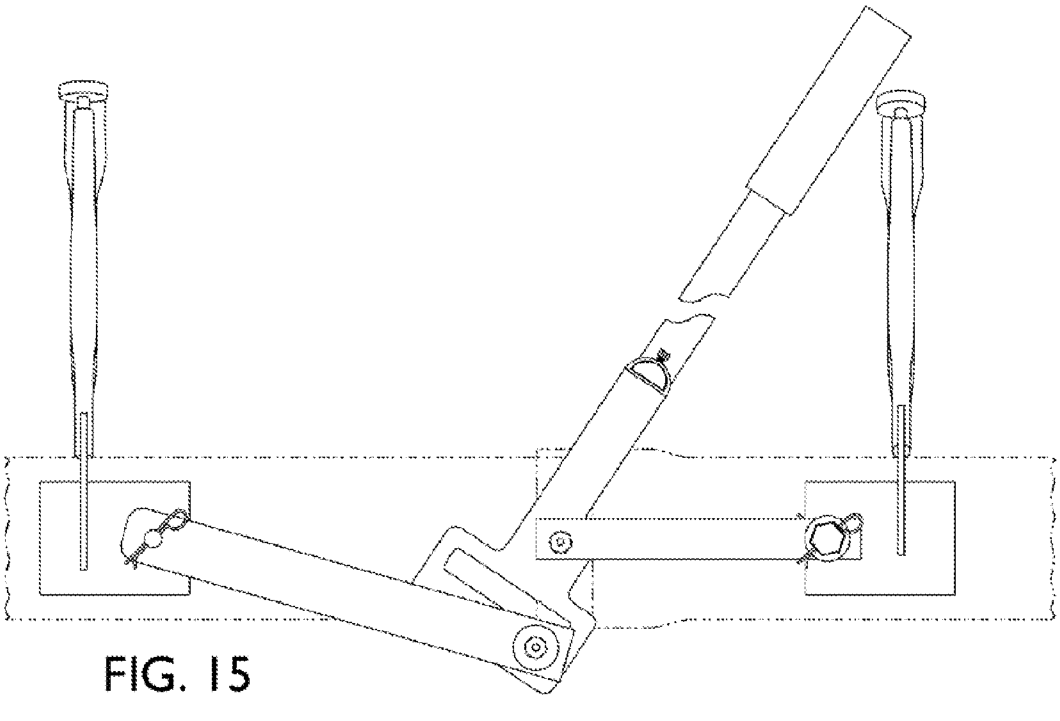
FIG. 15 depicts an elevation view of the right side of the invention of FIG. 14.
Figure 16:
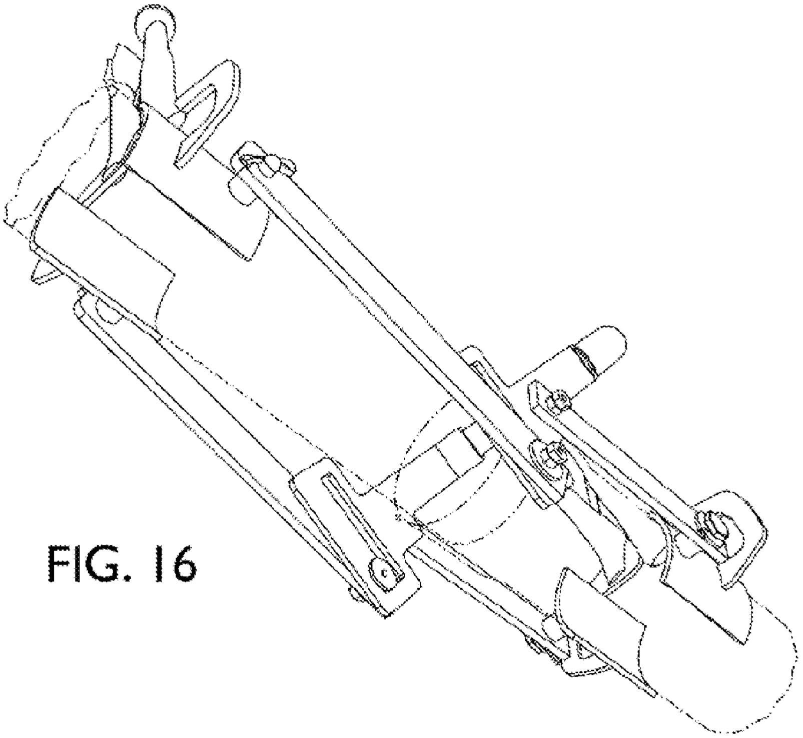
FIG. 16 depicts a perspective view of FIG. 15 from beneath the invention.
Figure 17:
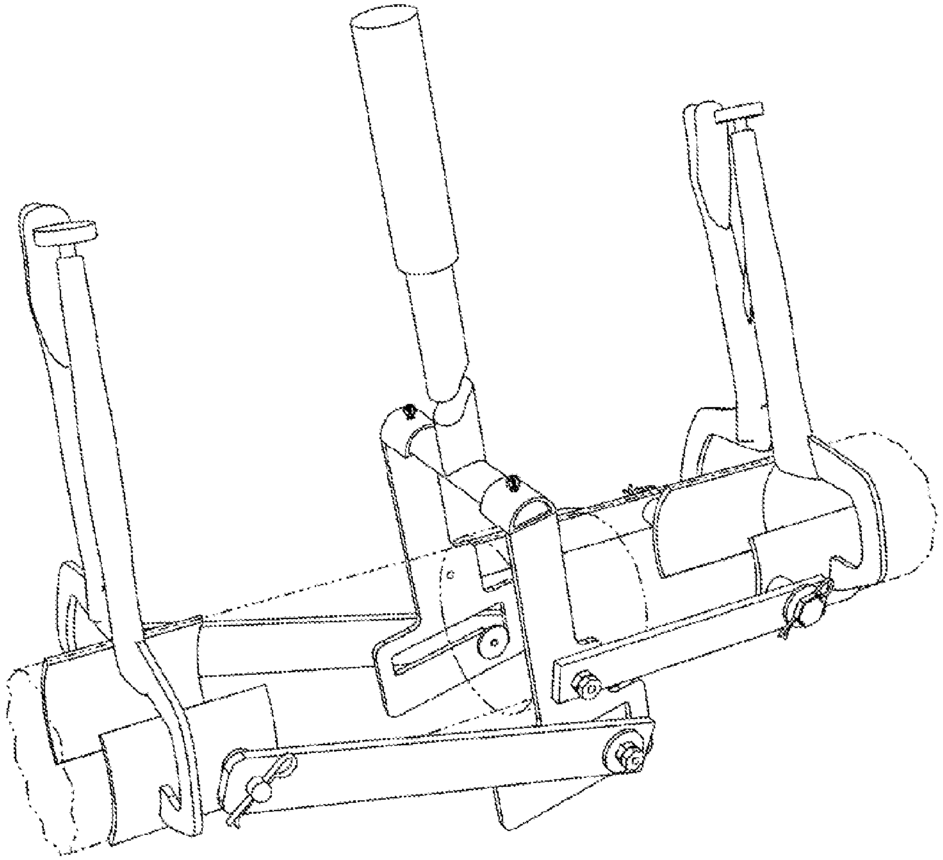
FIG. 17 depicts a perspective view of the invention of FIG. 1, at the end of its second coupling stroke.
Figure 18:
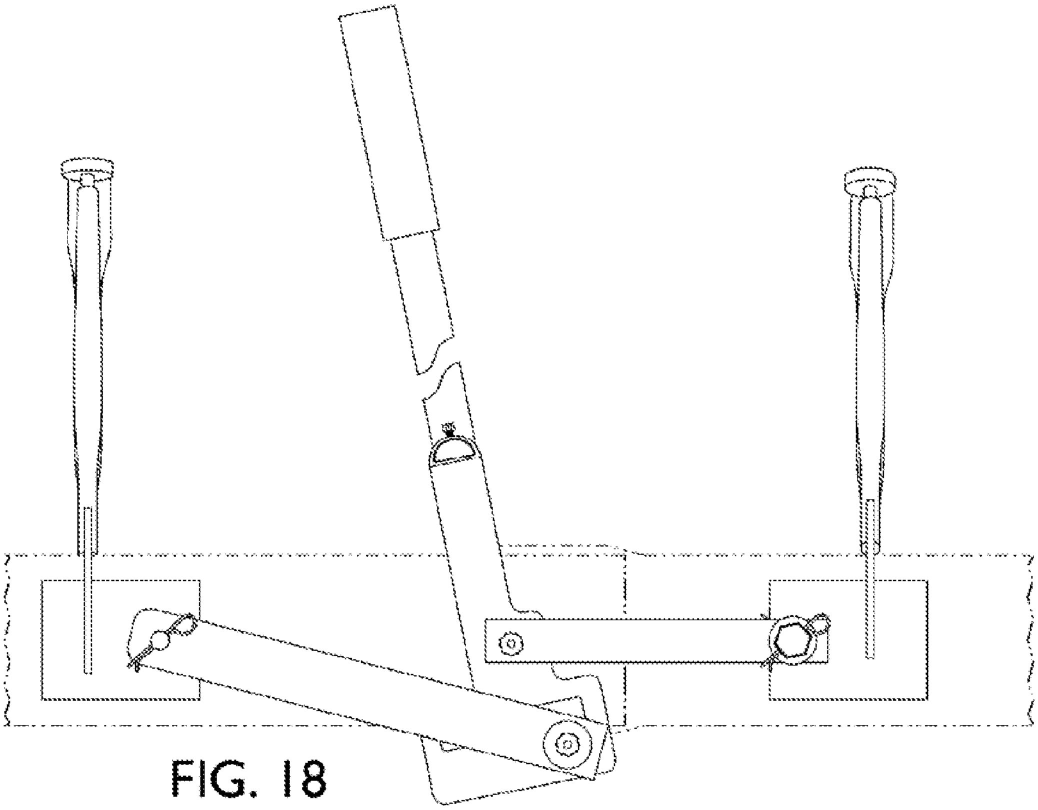
FIG. 18 depicts an elevation view of the right side of the invention of FIG. 17.
Figure 19:
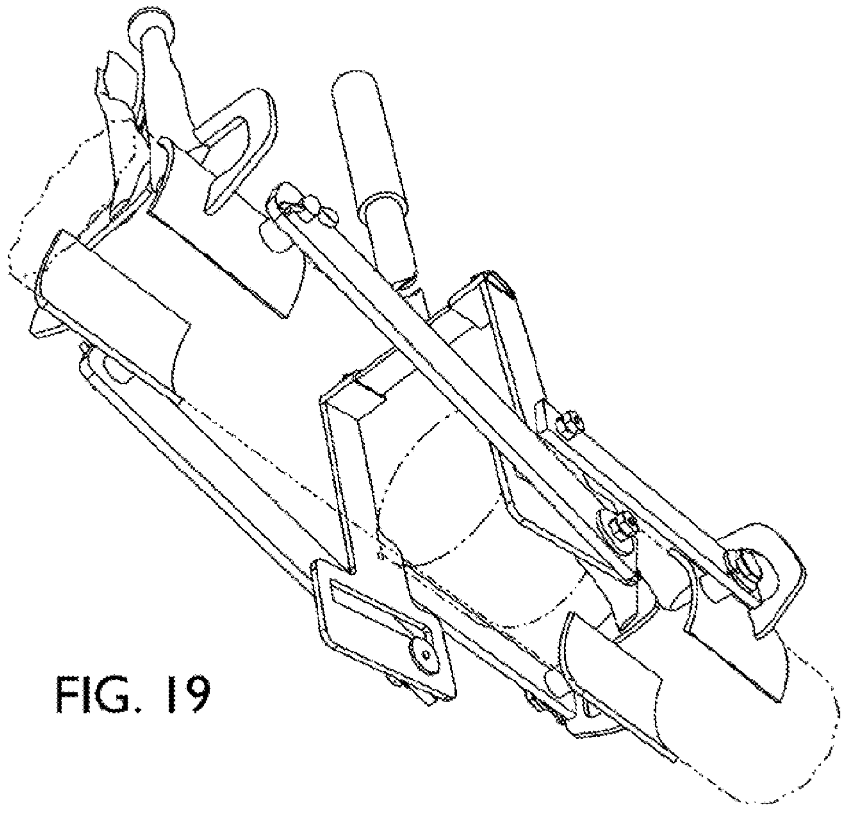
FIG. 19 depicts a perspective view of FIG. 18 from beneath the invention.

FIGS. 1 through 19 illustrate certain details of certain embodiments. However, the invention disclosed herein is not limited to only the embodiments so illustrated. The invention disclosed herein may have equally effective or legally equivalent embodiments.

(H) DETAILED DESCRIPTION OF THE INVENTION

For the sake of simplicity and to give the claims of this patent application the broadest interpretation and construction possible, the following definitions will apply:

The term "lockpin" essentially means a pin or similar member having a capability of being locked into a position; examples include (without limitation) a bolt having a threaded end accepting a nut or locknut, a pin having a hole near one end for accepting insertion of a cotter pin, or any means of such locking; locking does not necessarily preclude unlocking, or subsequent re-locking.

The term "pivot-pin" essentially means a pin or similar member having a capability of linking at least two structural elements in a pivoting relationship as by, for example (and without limitation) impaling holes in each element, having end-stops preventing removal of the elements from such pivotal relationships, or any other means of such pivoting.

The term "fulcrum-pin" essentially means a pin or similar member having a capability of linking at least two structural elements in a fulcrumatic relationship as by, for example (and without limitation) impaling holes in each element, and having end-stops preventing removal of the elements from such fulcrumatic relationship.

Also for the sake of simplicity, the conjunctive "and" may also be taken to include the disjunctive "or," and vice versa, whenever necessary to give the claims herein the broadest interpretation and construction possible. Likewise, when the plural form is used, it may be taken to include the singular form, and vice versa.

The invention disclosed herein is not limited by construction materials to the extent that such materials satisfy the structural and/or functional requirements of any claim. For example, although plate material essentially comprises steel, it may include any material capable of providing the necessary structural rigidity and fulcrumatic and/or leveraging support. Such materials may include (for example) metals, and alloys, polymers and plastics, and mixtures and combinations thereof.

The primary pieces pipe coupler may be made in a number of ways, and assembly may likewise be occur in a number of sequences. For example, for one early prototype, cut a threaded pipe coupling having a 4-inch diameter in half, resulting it two arcing pieces that will eventually be used as pipe-interfacing shoes as part of the clamping pincers that grip each section of pipe to be coupled. (Note that the invention is not limited to the use of a 4-inch pipe, or the dimensions of any of the other elements identified herein). Drill a ½-inch hole in each of the shoes, and fit a ½-inch hardened steel pin (with a small cotter-pin hole drilled through one end) into the side of each, then weld each in place so that the pin protrudes from the concave surface of the respective arcing shoe. Both of the clamping mechanisms may be fabricated from two locking C-clamp vise-grips, by cutting the pincer ends off of the clamps and welding the shoes to them. In another version of the pipe coupler, different size shoes may be bolted or pinned onto the clamps.

The leverage plates for the leverage assembly may be made from 4-inch×3⁄16-inch steel flat stock. Cut a slot or channel into the planar side of both plates, each channel ending in a drop notch nearest the direction you wish to leverage/pull the pipe for coupling (usually toward the section of pipe having the bell-end). This notch will allow another leveraging stroke to be made when using pipe having a relatively longer bell coupling end, without reclamping the tool to pipes. Drill a hole near the middle of each of the leverage plates, for connecting the linkage arms to the clamp on the pipe in the direction you wish to leverage/pull the pipe for coupling. A steel span connects both leverage plates, and it has a leverage handle upstanding from the top surface.

To allow adjustment of the width of the leverage plates along the span (to accommodate straddling of pipes having different diameter), each span may be made of 1-inch steel square tubing. Each leverage plate may downstand from a collar made of 1½-inch square tubing, capturing the 1-inch span.

The connecting linkages (arms and legs to clamps) may be made from 1½-inch×3⁄16-inch steel flat bar. Drill a 9⁄16-inch hole in the ends that connect to a clamping shoe, and a ½-inch hole in the ends that connect to a leverage plate. Each stationary (fulcrumatic) connecting link (arm) may be bolted to a leverage plate using a ⅜-inch steel bolt, and washer with lock nut. The leveraging connecting link (leg) to the drop notch may be connected the same way, with the exception of using larger diameter washers and leaving the lock nuts a bit looser to allow the link to slide for a second-stroke extension.

The most general form of the pipe coupler includes (comprises) an adjustable means of temporarily gripping opposite sides of a pipe having a female bell-end and an adjustable means of temporarily gripping opposite sides of a separate pipe having a male-end aligned with the bell-end, together with a means of leveraging the male-end into the bell-end, including a leverage handle. It may also include a plurality of legs leveragingly linking said male-end gripping means to said leveraging means, and a plurality of arms fulcrumatically linking said bell-end gripping means to said leveraging means, between said leveraging linkings and said leverage handle; movement of said leverage handle from a starting position toward the bell-end to an ending position toward the gripped male-end leverages the male-end into the gripped bell-end.

The means of leveraging the male-end into the bell-end may further include a span affixed to a lower end of the leverage handle, including a span length from a first span-end to a second span-end at least slightly larger than the diameter of the pipes to be coupled. A first leverage plate may downstand from the first span-end and define a first intermediate hole, whereas a second leverage plate may downstand from the second span-end and define a second intermediate hole. The arms may include a first arm defining a first leverage-end hole, and a second arm defining a second leverage-end hole. The fulcrumatic linking of the bell-end gripping means to the leveraging means may include a first fulcrum pin impaling the first leverage-end hole and the first intermediate hole aligned therewith, and a second fulcrum pin impaling the second leverage-end hole and the second intermediate hole aligned therewith. Accordingly the first leverage plate and second leverage plate may be capable of straddling a pipe and its respective coupling end along a respective first side and second side.

The span further may include a means of adjusting the span length to accommodate straddling of pairs of coupling pipes of different diameter. Accordingly, the first leverage plate further may include a first apical collar sized to snugly accept the first span-end inserted therethrough, the first collar defining a first threaded bore sized to accept a first bolt rotated therethrough and into engaging contact with the first span-end to prevent removal from the first collar. The second leverage plate further may include a second apical collar sized to snugly accept the second span-end inserted therethrough, the second collar defining a second threaded bore sized to accept a second bolt rotated therethrough and into engaging contact with the second span-end to prevent removal from the second collar.

The adjustable means of temporarily gripping opposite sides of the pipe having a bell-end may include a handgrip-actuated lock-gripping bell-end clamp. The lock-gripping bell-end clamp may include a means of adjusting the separation of the first bell-shoe and second bell-shoe at the gripping of opposite sides of the pipe.

The handgrip-actuated adjustable lock-gripping bell-end clamp may include a first bell-pincer including a first bell-shoe having a concave inner surface and a first outer surface, and an opposite second bell-pincer including a second bell-shoe having a concave inner surface and a second outer surface. The first arm may further define a first bell-end hole, the second arm further defining a second bell-end hole; the first bell-shoe outer surface may have a first bell-lockpin outstanding therefrom, whereas the second bell-shoe outer surface may have a second bell-lockpin outstanding therefrom. Accordingly, the fulcrumatic linking of the bell-end gripping means to the leveraging means further may include the first bell-lockpin impaling the first bell-end hole, and the second bell-lockpin impaling the second bell-end hole.

The first leverage plate may further define a first leverage hole, whereas the first leg may define a first leg-leverage hole. The second leverage plate may further define a second leverage hole, whereas the second leg defining a second leg-leverage hole. Accordingly, the leveraging linking of the male-end gripping means to the leveraging means may include a first leverage-pin impaling the first leg-leverage hole and the first leverage hole aligned therewith, in addition to a second leverage-pin impaling the second leg-leverage hole and the second leverage hole aligned therewith.

The adjustable means of temporarily gripping opposite sides of the pipe having a male-end may include a handgrip-actuated adjustable lock-gripping male-end clamp. The lock-gripping male-end clamp may include a means of adjusting the separation of the first male-shoe and second male-shoe at the gripping of opposite sides of the pipe. The handgrip-actuated adjustable lock-gripping male-end clamp may include a first male-pincer including a first male-shoe having a concave inner surface and a first outer surface, and an opposite second male-pincer including a second male-shoe having a concave inner surface and a second outer surface. The first leg further may define a first male-end hole, the second leg further defining a second male-end hole. The first male-shoe outer surface may have a first male-lockpin outstanding therefrom, the second male-shoe outer surface having a second male-lockpin outstanding therefrom. Accordingly, the leveraging linking of the male-end gripping means to the leveraging means further may include the first male-lockpin impaling the first male-end hole, and the second male-lockpin impaling the second male-end hole.

The first leverage hole may further include a first leverage channel terminating in a first bell-end dropnotch. The first leg may define a first leg-leverage hole. The second leverage hole may further including a second leverage channel terminating in a second bell-end dropnotch; the second leg may define a second leg-leverage hole. Accordingly, additional leveraging may be accomplished by returning the leverage handle to its starting position (moving each leverage-pin along the respective leverage channel and into the respective bell-end dropnotch), and moving the leverage handle from the starting position toward the bell-end to an ending position toward the male-end.

In one detailed embodiment, the pipe coupler may include an adjustable means of temporarily gripping opposite sides of a pipe having a female bell-end, an adjustable means of temporarily gripping opposite sides of a separate pipe having a male-end aligned with the bell-end, and a means of leveraging the male-end into the bell-end may include a leverage handle. It may further include a plurality of legs leveragingly linking the male-end gripping means to the leveraging means, and a plurality of arms fulcrumatically linking the bell-end gripping means to the leveraging means, between the leveraging linkings and the leverage handle, wherein movement of the leverage handle from a starting position toward the bell-end to an ending position toward the male-end leverages the male-end into the bell-end. In this version:

(a) said adjustable means of temporarily gripping opposite sides of the pipe having a bell-end may include a handgrip-actuated adjustable lock-gripping bell-end clamp having a first bell-pincer (11) including a first bell-shoe (12) having a concave inner surface and a first outer surface including a first bell-lockpin (13) outstanding therefrom, and an opposite second bell-pincer (21) including a second bell-shoe (22) having a concave inner surface and a second outer surface including a second bell-lockpin (23) outstanding therefrom;

(b) said adjustable means of temporarily gripping opposite sides of the pipe having a male-end may include a handgrip-actuated adjustable lock-gripping male-end clamp having a first male-pincer (71) including a first male-shoe (72) having a concave inner surface and a first outer surface including a first male-lockpin (73) outstanding therefrom, and an opposite second male-pincer (81) including a second male-shoe (82) having a concave inner surface and a second outer surface including a second male-lockpin (83) outstanding therefrom; and (c) said leveraging means further comprising:

(1) a span (38) affixed to a lower end of the leverage handle (30) and may include a span length from a first span-end to a second span-end at least slightly larger than the diameter of the pipes to be coupled, a first leverage plate (31) downstanding from the first span-end and defining a first intermediate hole and a first leverage hole including a first leverage channel (36) terminating in a first bell-end dropnotch (37), and a second leverage plate (41) downstanding from the second span-end and defining a second intermediate hole and a second leverage hole including a second leverage channel (46) terminating in a second bell-end dropnotch (47);

(2) said arms may include a first arm (15) defining a first leverage-end hole and a first bell-end hole, and a second arm (25) defining a second leverage-end hole and a second bell-end hole, the fulcrumatic linking of the bell-end gripping means to the leveraging means may include a first fulcrum pin (33) impaling the first leverage-end hole and the first intermediate hole aligned therewith, and a second fulcrum pin (43) impaling the second leverage-end hole and the second intermediate hole aligned therewith, the fulcrumatic linking of the bell-end gripping means to the leveraging means further may include the first bell-lockpin impaling the first bell-end hole, and the second bell-lockpin impaling the second bell-end hole, the first leverage plate and second leverage plate capable of straddling a pipe and its respective coupling end along a respective first side and second side; and (3) said legs may include a first leg (75) defining a first leg-leverage hole and a first male-end hole, and a second leg (85) defining a second leg-leverage hole and a second male-end hole, the leveraging linking of the male-end gripping means to the leveraging means may include a first leverage-pin (77) impaling the first leg-leverage hole and the first leverage hole aligned therewith, and a second leverage-pin (87) impaling the second leg-leverage hole and the second leverage hole aligned therewith, the leveraging linking of the male-end gripping means to the leveraging means further may include the first male-lockpin impaling the first male-end hole, and the second male-lockpin impaling the second male-end hole.

Accordingly, additional leveraging may be accomplished by returning the leverage handle to its starting position (thereby moving each leverage-pin along the respective leverage channel and into the respective bell-end dropnotch), then moving the leverage handle from the starting position toward the bell-end to an ending position toward the male-end.

The span further may include a means of adjusting the span length to accommodate straddling of pairs of coupling pipes of different diameter. The first leverage plate further may include a first apical collar sized to snugly accept the first span-end inserted therethrough, the first collar defining a first threaded bore sized to accept a first bolt rotated therethrough and into engaging contact with the first span-end to prevent its removal from the first collar. The second leverage plate further may include a second apical collar sized to snugly accept the second span-end inserted therethrough, the second collar defining a second threaded bore sized to accept a second bolt rotated therethrough and into engaging contact with the second span-end to prevent its removal from the second collar.

Besides the machine disclosed herein, the invention also includes a method of coupling pipes. In general, the method of using the pipe coupler includes the steps of:

(a) with the leverage handle of the coupling device described above in its starting position, lock-gripping the bell-end of a pipe with the adjustable lock-gripping bell-end clamp, and lock-gripping the male-end of a separate aligned pipe with the adjustable lock-gripping male-end clamp; and (b) moving the leverage handle to an ending position toward the male-end.

If necessary for complete coupling, the method of use may include the steps of returning the leverage handle to an ending position toward the male-end (thereby moving each leverage-pin along the respective leverage channel and into the respective bell-end dropnotch), then moving the leverage handle toward and ending position toward the other pipe end.

Those skilled in the art who have the benefit of this disclosure will appreciate that it may be used as the creative basis for designing devices or methods similar to those disclosed herein, or to design improvements to the invention disclosed herein; such new or improved creations should be recognized as dependent upon the invention disclosed herein, to the extent of such reliance upon this disclosure.

I claim:

1. A device for coupling aligned piping comprising:

(a) an adjustable means of temporarily gripping opposite sides of a pipe having a female-end;

(b) an adjustable means of temporarily gripping opposite sides of a separate pipe having a male-end aligned with the female-end;

(c) a means of leveraging the male-end into the female-end, including a leverage handle;

(d) a plurality of legs leveragingly linking said male-end gripping means to said leveraging means; and (e) a plurality of arms fulcrumatically linking said female-end gripping means to said leveraging means, between said leveraging linkings and said leverage handle;

(f) a span affixed to a lower end of said leverage handle and comprising a span length from a first span-end to a second span-end at least slightly larger than the diameter of the pipes to be coupled, a first leverage plate downstanding from said first span-end and defining a first intermediate hole, and a second leverage plate downstanding from said second span-end and defining a second intermediate hole; said arms comprising a first arm defining a first leverage-end hole, and a second arm defining a second leverage-end hole, said fulcrumatic linking of said female-end gripping means to said leveraging means comprising a first fulcrum pin impaling said first leverage-end hole and with said first fulcrum pin in said first leverage-end hole located between the handle and said first leverage plate, and a second fulcrum pin impaling said second leverage-end hole and with said second fulcrum pin in said second leverage-end hole located between the handle and said second leverage plate, said first leverage plate and second leverage plate capable of straddling a pipe and its respective coupling end along a respective first side and second side; wherein movement of said leverage handle from a starting position toward the female-end to an ending position toward the gripped male-end leverages the male-end into the gripped female-end.

2. A coupling device described in claim 1, said span further comprising a means of adjusting said span length to accommodate straddling of pairs of coupling pipes of different diameter.

3. A coupling device described in claim 2, said first leverage plate further comprising a first apical collar sized to snugly accept said first span-end inserted therethrough, said first collar defining a first threaded bore sized to accept a first bolt rotated therethrough and into engaging contact with said first span-end to prevent removal from said first collar.

4. A coupling device described in claim 3, said second leverage plate further comprising a second apical collar sized to snugly accept said second span-end inserted therethrough, said second collar defining a second threaded bore sized to accept a second bolt rotated therethrough and into engaging contact with said second span-end to prevent removal from said second collar.

5. A coupling device described in claim 4, said adjustable means of temporarily gripping opposite sides of the pipe having a female-end comprising a handgrip-actuated lock-gripping female-end clamp.

6. A coupling device described in claim 5, said lock-gripping female-end clamp comprising a means of adjusting the separation of said first bell-shoe and second bell-shoe at said gripping of opposite sides of the pipe.

7. A coupling device described in claim 5, said handgrip-actuated adjustable lock-gripping female-end clamp comprising a first bell-pincer including a first bell-shoe having a concave inner surface and a first outer surface, and an opposite second bell-pincer including a second bell-shoe having a concave inner surface and a second outer surface.

8. A coupling device described in claim 7, said first arm further defining a first female-end hole, said second arm further defining a second female-end hole, said first bell-shoe outer surface having a first bell-lockpin outstanding therefrom, said second bell-shoe outer surface having a second bell-lockpin outstanding therefrom, said fulcrumatic linking of said female-end gripping means to said leveraging means further comprising said first bell-lockpin impaling said first female-end hole, and said second bell-lockpin impaling said second female-end hole.

9. A coupling device described in claim 8, said first leverage plate further defining a first leverage hole, said first leg defining a first leg-leverage hole, said second leverage plate further defining a second leverage hole, said second leg defining a second leg-leverage hole, said leveraging linking of said male-end gripping means to said leveraging means comprising a first leverage-pin impaling said first leg-leverage hole and said first leverage hole aligned therewith, and a second leverage-pin impaling said second leg-leverage hole and said second leverage hole aligned therewith.

10. A coupling device described in claim 9, said adjustable means of temporarily gripping opposite sides of the pipe having a male-end comprising a handgrip-actuated adjustable lock-gripping male-end clamp.

11. A coupling device described in claim 10, said lock-gripping male-end clamp comprising a means of adjusting the separation of said first male-shoe and second male-shoe at said gripping of opposite sides of the pipe.

12. A coupling device described in claim 11, said handgrip-actuated adjustable lock-gripping male-end clamp comprising a first male-pincer including a first male-shoe having a concave inner surface and a first outer surface, and an opposite second male-pincer including a second male-shoe having a concave inner surface and a second outer surface.

13. A coupling device described in claim 12, said first leg further defining a first male-end hole, said second leg further defining a second male-end hole, said first male-shoe outer surface having a first male-lockpin outstanding therefrom, said second male-shoe outer surface having a second male-lockpin outstanding therefrom, said leveraging linking of said male-end gripping means to said leveraging means further comprising said first male-lockpin impaling said first male-end hole, and said second male-lockpin impaling said second male-end hole.

14. A coupling device described in claim 13, said first leverage hole further including a first leverage channel terminating in a first female-end dropnotch, said first leg defining a first leg-leverage hole, said second leverage hole further including a second leverage channel terminating in a second female-end dropnotch, wherein additional leveraging may be accomplished by returning said leverage handle to said starting position, and moving said leverage handle from the starting position toward the female-end to an ending position toward the male-end.

15. A device for coupling aligned piping comprising an adjustable means of temporarily gripping opposite sides of a pipe having a female bell-end, an adjustable means of temporarily gripping opposite sides of a separate pipe having a male-end aligned with the bell-end, and a means of leveraging the male-end into the bell-end comprising a leverage handle, a plurality of legs leveragingly linking said male-end gripping means to said leveraging means, and a plurality of arms fulcrumatically linking said bell-end gripping means to said leveraging means, between said leveraging linkings and said leverage handle, wherein movement of said leverage handle from a starting position toward the bell-end to an ending position toward the male-end leverages the male-end into the bell-end;

a. said adjustable means of temporarily gripping opposite sides of the pipe having a bell-end comprising a handgrip-actuated adjustable lock-gripping bell-end clamp comprising a first bell-pincer including a first bell-shoe having a concave inner surface and a first outer surface including a first bell-lockpin outstanding therefrom, and an opposite second bell-pincer including a second bell-shoe having a concave inner surface and a second outer surface including a second bell-lockpin outstanding therefrom;

b. said adjustable means of temporarily gripping opposite sides of the pipe having a male-end comprising a handgrip-actuated adjustable lock-gripping male-end clamp comprising a first male-pincer including a first male-shoe having a concave inner surface and a first outer surface including a first male-lockpin outstanding therefrom, and an opposite second male-pincer including a second male-shoe having a concave inner surface and a second outer surface including a second male-lockpin outstanding therefrom; and c. said leveraging means further comprising:

(1) a span affixed to a lower end of said leverage handle and comprising a span length from a first span-end to a second span-end at least slightly larger than the diameter of the pipes to be coupled, a first leverage plate downstanding from said first span-end and defining a first intermediate hole and a first leverage hole including a first leverage channel terminating in a first bell-end dropnotch, and a second leverage plate downstanding from said second span-end and defining a second intermediate hole and a second leverage hole including a second leverage channel terminating in a second bell-end dropnotch;

(2) said arms comprising a first arm defining a first leverage-end hole and a first bell-end hole, and a second arm defining a second leverage-end hole and a second bell-end hole, said fulcrumatic linking of said bell-end gripping means to said leveraging means comprising a first fulcrum pin impaling said first leverage-end hole and said first intermediate hole aligned therewith, with said first fulcrum pin in said first leverage-end hole located between the handle and said first leverage plate, and a second fulcrum pin impaling said second leverage-end hole and said second intermediate hole aligned therewith, with said second fulcrum pin in said second leverage-end hole located between the handle and said second leverage plate, said fulcrumatic linking of said bell-end gripping means to said leveraging means further comprising said first bell-lockpin impaling said first bell-end hole, and said second bell-lockpin impaling said second bell-end hole, said first leverage plate and second leverage plate capable of straddling a pipe and its respective coupling end along a respective first side and second side; and (3) said legs comprising a first leg defining a first leg-leverage hole and a first male-end hole, and a second leg defining a second leg-leverage hole and a second male-end hole, said leveraging linking of said male-end gripping means to said leveraging means comprising a first leverage-pin impaling said first leg-leverage hole and said first leverage hole aligned therewith, and a second leverage-pin impaling said second leg-leverage hole and said second leverage hole aligned therewith, said leveraging linking of said male-end gripping means to said leveraging means further comprising said first male-lockpin impaling said first male-end hole, and said second male-lockpin impaling said second male-end hole;

wherein additional leveraging may be accomplished by returning said leverage handle to said starting position, and moving said leverage handle from the starting position toward the bell-end to an ending position toward the male-end.

16. A coupling device described in claim 15, said span further comprising a means of adjusting said span length to accommodate straddling of pairs of coupling pipes of different diameter, comprising said first leverage plate further comprising a first apical collar sized to snugly accept said first span-end inserted therethrough, said first collar defining a first threaded bore sized to accept a first bolt rotated therethrough and into engaging contact with said first span-end to prevent removal from said first collar.

17. A coupling device described in claim 16, said second leverage plate further comprising a second apical collar sized to snugly accept said second span-end inserted therethrough, said second collar defining a second threaded bore sized to accept a second bolt rotated therethrough and into engaging contact with said second span-end to prevent removal from said second collar.

18. A method for coupling aligned piping using a coupling device including an adjustable means of temporarily gripping opposite sides of a pipe having a female bell-end, an adjustable means of temporarily gripping opposite sides of a separate pipe having a male-end aligned with the bell-end, and a means of leveraging the male-end into the bell-end comprising a leverage handle, a plurality of legs leveragingly linking said male-end gripping means to said leveraging means, and a plurality of arms fulcrumatically linking said bell-end gripping means to said leveraging means, between said leveraging linkings and said leverage handle, wherein movement of said leverage handle from a starting position toward the bell-end to an ending position toward the male-end leverages the male-end into the bell-end;

a. said adjustable means of temporarily gripping opposite sides of the pipe having a bell-end comprising a handgrip-actuated adjustable lock-gripping bell-end clamp comprising a first bell-pincer including a first bell-shoe having a concave inner surface and a first outer surface including a first bell-lockpin outstanding therefrom, and an opposite second bell-pincer including a second bell-shoe having a concave inner surface and a second outer surface including a second bell-lockpin outstanding therefrom;

b. said adjustable means of temporarily gripping opposite sides of the pipe having a male-end comprising a handgrip-actuated adjustable lock-gripping male-end clamp comprising a first male-pincer including a first male-shoe having a concave inner surface and a first outer surface including a first male-lockpin outstanding therefrom, and an opposite second male-pincer including a second male-shoe having a concave inner surface and a second outer surface including a second male-lockpin outstanding therefrom; and c. said leveraging means further comprising:

(1) a span affixed to a lower end of said leverage handle and comprising a span length from a first span-end to a second span-end at least slightly larger than the diameter of the pipes to be coupled, a first leverage plate downstanding from said first span-end and defining a first intermediate hole and a first leverage hole including a first leverage channel terminating in a first bell-end dropnotch, and a second leverage plate downstanding from said second span-end and defining a second intermediate hole and a second leverage hole including a second leverage channel terminating in a second bell-end dropnotch;

(2) said arms comprising a first arm defining a first leverage-end hole and a first bell-end hole, and a second arm defining a second leverage-end hole and a second bell-end hole, said fulcrumatic linking of said bell-end gripping means to said leveraging means comprising a first fulcrum pin impaling said first leverage-end hole and said first intermediate hole aligned therewith, with said first fulcrum pin in said first leverage-end hole located between the handle and said first leverage plate, and a second fulcrum pin impaling said second leverage-end hole and said second intermediate hole aligned therewith, with said second fulcrum pin in said second leverage-end hole located between the handle and said second leverage plate, said fulcrumatic linking of said bell-end gripping means to said leveraging means further comprising said first bell-lockpin impaling said first bell-end hole, and said second bell-lockpin impaling said second bell-end hole, said first leverage plate and second leverage plate capable of straddling a pipe and its respective coupling end along a respective first side and second side; and (3) said legs comprising a first leg defining a first leg-leverage hole and a first male-end hole, and a second leg defining a second leg-leverage hole and a second male-end hole, said leveraging linking of said male-end gripping means to said leveraging means comprising a first leverage-pin impaling said first leg-leverage hole and said first leverage hole aligned therewith, and a second leverage-pin impaling said second leg-leverage hole and said second leverage hole aligned therewith, said leveraging linking of said male-end gripping means to said leveraging means further comprising said first male-lockpin impaling said first male-end hole, and said second male-lockping impaling said second male-end hole;

said method of coupling comprising the steps of:

(a) with the leverage handle of the coupling device in its starting position, lock-gripping the bell-end of a pipe with the adjustable lock-gripping bell-end clamp, and lock-gripping the male-end of a separate aligned pipe with the adjustable lock-gripping male-end clamp; and (b) moving the leverage handle to an ending position toward the male-end.

19. A method of coupling aligned piping described in claim 18, further comprising the steps of, if necessary for complete coupling, returning the leverage handle to said starting position, then moving it toward the male-end.

* * * * *